(12) United States Patent  
Sugiyama (10) Patent No.: US 10,897,157 B2  
(45) Date of Patent: Jan. 19, 2021

(54) POWER TRANSMISSION DEVICE, POWER RECEPTION DEVICE AND WIRELESS POWER TRANSFER SYSTEM

(71) Applicant: Toyota Jidosha Kabushiki Kaisha, Toyota (JP)

(72) Inventor: Yoshinobu Sugiyama, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 184 days.

(21) Appl. No.: 16/103,432

(22) Filed: Aug. 14, 2018

(65) Prior Publication Data

US 2019/0081512 A1   Mar. 14, 2019

(30) Foreign Application Priority Data

Sep. 13, 2017 (JP) ................................ 2017-175707

(51) Int. Cl.
| | |
|---|---|
| G06K 7/01 | (2006.01) |
| G06K 19/073 | (2006.01) |
| H02J 50/12 | (2016.01) |
| H02J 7/02 | (2016.01) |
| B60L 53/12 | (2019.01) |

(52) U.S. Cl.
CPC .............. H02J 50/12 (2016.02); H02J 7/025 (2013.01); B60L 53/12 (2019.02)

(58) Field of Classification Search
CPC ........ H02J 50/12; H02J 7/025; H02J 2310/48; B60L 53/12
See application file for complete search history.

(56) References Cited

U.S. PATENT DOCUMENTS

| 7,741,734 B2 | 6/2010 | Joannopoulos et al. |
| 2007/0222542 A1 | 9/2007 | Joannopoulos et al. |
| 2008/0278264 A1 | 11/2008 | Karalis et al. |
| 2009/0195332 A1 | 8/2009 | Joannopoulos et al. |
| 2009/0195333 A1 | 8/2009 | Joannopoulos et al. |
| 2009/0224856 A1 | 9/2009 | Karalis et al. |
| 2009/0267709 A1 | 10/2009 | Joannopoulos et al. |
| 2009/0267710 A1 | 10/2009 | Joannopoulos et al. |
| 2010/0096934 A1 | 4/2010 | Joannopoulos et al. |

(Continued)

FOREIGN PATENT DOCUMENTS

| AU | 2006269374 B2 | 10/2009 |
| AU | 2007349874 A2 | 1/2010 |

(Continued)

*Primary Examiner* — Carlos Amaya  
*Assistant Examiner* — Esayas G Yeshaw  
(74) *Attorney, Agent, or Firm* — Dinsmore & Shohl LLP (57) ABSTRACT

A power supply ECU executes a control process including: when it is determined that wireless charging is being performed, a step of acquiring a current I1 and a voltage V1 during power transmission operation; when it is determined that the power transmission operation is being performed and the power cannot be received, a step of determining whether or not a value of V1/I1 is greater than a threshold value R0; when it is determined that the value of V1/I1 is greater than threshold value R0, a step of determining that a power transmission coil has been short-circuited; and when it is determined that the value of V1/I1 is smaller than or equal to threshold value R0, a step of determining that a power reception coil has been short-circuited.

5 Claims, 6 Drawing Sheets

(56) References Cited

U.S. PATENT DOCUMENTS

| | | |
|---|---|---|
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0171370 A1 | 7/2010 | Karalis et al. |
| 2010/0181844 A1 | 7/2010 | Karalis et al. |
| 2010/0187911 A1 | 7/2010 | Joannopoulos et al. |
| 2010/0201205 A1 | 8/2010 | Karalis et al. |
| 2010/0207458 A1 | 8/2010 | Joannopoulos et al. |
| 2010/0225175 A1 | 9/2010 | Karalis et al. |
| 2010/0231053 A1 | 9/2010 | Karalis et al. |
| 2010/0237706 A1 | 9/2010 | Karalis et al. |
| 2010/0237707 A1 | 9/2010 | Karalis et al. |
| 2010/0237708 A1 | 9/2010 | Karalis et al. |
| 2010/0253152 A1 | 10/2010 | Karalis et al. |
| 2010/0264745 A1 | 10/2010 | Karalis et al. |
| 2012/0050015 A1* | 3/2012 | Low .................. G06K 7/10158 340/10.1 |
| 2013/0127409 A1 | 5/2013 | Ichikawa |
| 2013/0193749 A1 | 8/2013 | Nakamura et al. |
| 2016/0190852 A1* | 6/2016 | Chiang .................. H02J 7/025 320/108 |
| 2017/0063161 A1 | 3/2017 | Sugiyama et al. |
| 2017/0250574 A1* | 8/2017 | Min ........................ H02J 50/40 |
| 2017/0310145 A1* | 10/2017 | Crosby, II ............... H02J 50/12 |
| 2019/0027969 A1* | 1/2019 | Staring .................. H01F 27/28 |

FOREIGN PATENT DOCUMENTS

| | | |
|---|---|---|
| AU | 2010200044 A1 | 1/2010 |
| AU | 2006269374 C1 | 3/2010 |
| CA | 2615123 A1 | 1/2007 |
| CA | 2682284 A1 | 10/2008 |
| CN | 101258658 A | 9/2008 |
| CN | 101682216 A | 3/2010 |
| CN | 101860089 A | 10/2010 |
| EP | 1902505 A2 | 3/2008 |
| EP | 2130287 A1 | 12/2009 |
| IN | 735/DELNP/2008 | 5/2008 |
| IN | 6195/DELNP/2009 | 7/2010 |
| JP | 2009-501510 A | 1/2009 |
| JP | 2013-110822 A | 6/2013 |
| JP | 2013-126327 A | 6/2013 |
| JP | 2013-146148 A | 7/2013 |
| JP | 2013146154 A | 7/2013 |
| JP | 2013154815 A | 8/2013 |
| JP | 2017-046521 A | 3/2017 |
| KR | 20080031398 A | 4/2008 |
| KR | 20100015954 A | 2/2010 |
| WO | 2007008646 A2 | 1/2007 |
| WO | 2008118178 A1 | 10/2008 |
| WO | 2013108108 A2 | 7/2013 |

* cited by examiner

SHORT-CIRCUITING OF
POWER TRANSMISSION COIL

FIG.3

SHORT-CIRCUITING OF
POWER RECEPTION COIL

FIG.5

|  | <DURING NORMAL OPERATION OF POWER TRANSMISSION COIL> | <DURING SHORT-CIRCUITING OF POWER TRANSMISSION COIL> |
|---|---|---|
| CIRCUIT CONFIGURATION | (series C, L with AC source) | (C with AC source) |
| IMPEDANCE CALCULATION EQUATION | $Z=\sqrt{(\omega L - 1/\omega C)^2}$ | $Z = 1/\omega C$ |

POWER TRANSMISSION DEVICE, POWER RECEPTION DEVICE AND WIRELESS POWER TRANSFER SYSTEM

CROSS-REFERENCE TO RELATED APPLICATIONS

This nonprovisional application claims priority to Japanese Patent Application No. 2017-175707 filed on Sep. 13, 2017 with the Japan Patent Office, the entire contents of which are hereby incorporated by reference.

BACKGROUND

Field

The present disclosure relates to a wireless power transfer system using a power transmission device and a power reception device, and particularly to determining an abnormality during power transmission from the power transmission device to the power reception device.

Description of the Background Art

Conventionally, a technique is known for charging a battery mounted on a vehicle or the like using a wireless power transfer system that includes a power reception device provided on the vehicle side and a power transmission device connected to a power supply external to the vehicle, and that wirelessly transmits electric power from the power transmission device to the power reception device (see Japanese Patent Laying-Open Nos. 2013-154815, 2013-146154, 2013-146148, 2013-110822, and 2013-126327).

Japanese Patent Laying-Open No. 2017-046521, for example, discloses a technique for stopping wireless power transmission when an abnormality occurs in a wireless power transfer system during the power transmission.

SUMMARY

When an abnormality occurs in a wireless power transfer system, however, one of a coil used for power transmission in a power transmission device and a coil used for power reception in a power reception device has possibly been short-circuited, for example. Thus, to complete repairs immediately, it is desired to determine which of the power transmission device and the power reception device is to be repaired (which of the coils has been short-circuited).

An object of the present disclosure is to provide a power transmission device, a power reception device and a wireless power transfer system to determine, when an abnormality occurs during wireless power transmission, in which of the power transmission device and the power reception device the abnormality has occurred.

A power transmission device according to one aspect of the present disclosure is a power transmission device configured to wirelessly transmit electric power to a power reception device including a power reception coil. The power transmission device includes a power transmission circuit having a power transmission coil and a capacitor connected in series, and an abnormality determination device configured to determine, when the power cannot be received at the power reception device during power transmission operation of the power transmission device, in which of the power transmission device and the power reception device an abnormality has occurred. When the power cannot be received at the power reception device during the power transmission operation, the abnormality determination device is configured to calculate an impedance in the power transmission circuit from a voltage and a current in the power transmission circuit. The abnormality determination device is configured to determine that the power transmission coil has been short-circuited when the calculated impedance is greater than a threshold value. The abnormality determination device is configured to determine that the power reception coil has been short-circuited when the calculated impedance is smaller than the threshold value.

As such, when the power transmission coil has been short-circuited, the power transmission circuit has a circuit configuration including the capacitor and not including the power transmission coil, so that the impedance increases as compared to when the power transmission coil has not been short-circuited. Thus, when the impedance is greater than the threshold value, it can be determined that the power transmission coil has been short-circuited. When this impedance is smaller than the threshold value, it is highly likely that the power transmission coil has not been short-circuited, and it can be determined that the power reception coil has been short-circuited.

In one embodiment, the abnormality determination device is configured to determine, when a current is flowing in the power transmission circuit and a current is not flowing in the power reception device, that the power cannot be received at the power reception device during the power transmission operation.

As such, it can be determined that the power cannot be received at the power reception device during the power transmission.

In one embodiment, the threshold value is set by adding, to an impedance of the power transmission circuit when the power transmission coil has not been short-circuited, a predetermined value.

As such, the threshold value for determining whether the power transmission coil has been short-circuited or the power reception coil has been short-circuited can be set appropriately.

A power reception device according to another aspect of the present disclosure is a power reception device configured to wirelessly receive electric power from a power transmission device including a power transmission circuit having a power transmission coil and a capacitor connected in series. The power reception device includes a power reception coil, and an abnormality determination device configured to determine, when the power cannot be received at the power reception device during power transmission operation of the power transmission device, in which of the power transmission device and the power reception device an abnormality has occurred. When the power cannot be received at the power reception device during the power transmission operation, the abnormality determination device is configured to calculate an impedance in the power transmission circuit from a voltage and a current in the power transmission circuit. The abnormality determination device is configured to determine that the power transmission coil has been short-circuited when the calculated impedance is greater than a threshold value. The abnormality determination device is configured to determine that the power reception coil has been short-circuited when the calculated impedance is smaller than the threshold value.

A wireless power transfer system according to yet another aspect of the present disclosure includes: a power transmission device including a power transmission circuit having a power transmission coil and a capacitor connected in series, and configured to wirelessly transmit electric power; a power reception device including a power reception coil mid configured so wirelessly receive electric power from the power transmission device; and an abnormality determination device configured to determine, when the power cannot be received at the power reception device during power transmission operation of the power transmission device, in which of the power transmission device and the power reception device an abnormality has occurred. When the power cannot be received at the power reception device during the power transmission operation, the abnormality determination device is configured to calculate an impedance in the power transmission circuit from a voltage and a current in the power transmission circuit. The abnormality determination device is configured to determine that the power transmission coil has been short-circuited when the calculated impedance is greater than a threshold value. The abnormality determination device is configured to determine that the power reception coil has been short-circuited when the calculated impedance is smaller than the threshold value.

The foregoing and other objects, features, aspects and advantages of the present disclosure will become more apparent from the following detailed description of the present disclosure when taken in conjunction with the accompanying drawings.

DESCRIPTION OF THE EMBODIMENTS

Hereinafter, embodiments of the present disclosure will be described in detail with reference to the drawings. In the drawings, the same or corresponding portions have the same reference characters allotted, and description thereof will not be repeated.

<Configuration of Wireless Power Transfer System>

Figure 1:
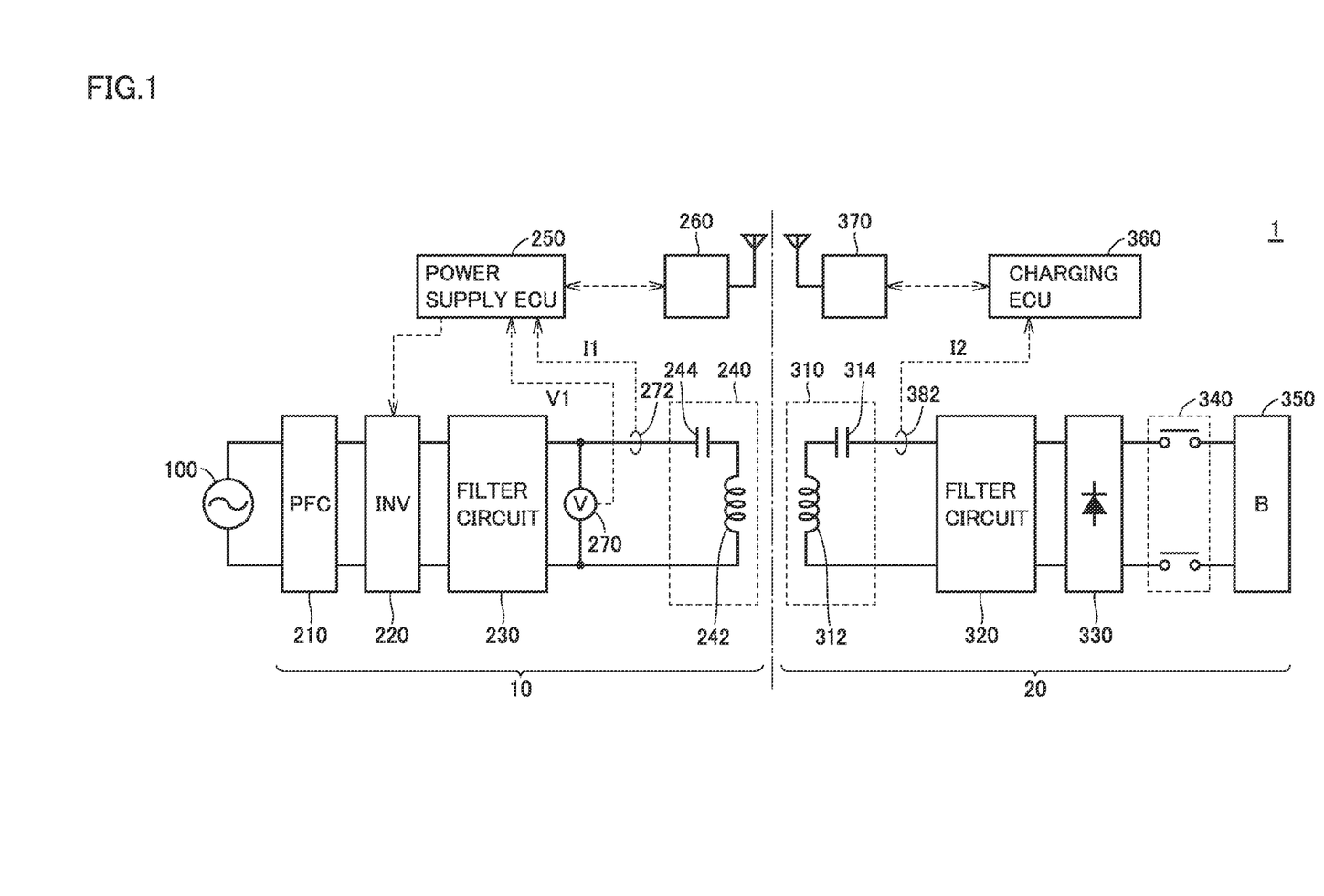
FIG. 1 is a diagram showing an overall configuration of a wireless power transfer system.

FIG. 1 is a diagram showing an overall configuration of a wireless power transfer system. Referring to FIG. 1, this wireless power transfer system 1 includes a power transmission device 10 and a power reception device 20.

Power transmission device 10 transmits AC power received from an AC power supply 100 (system power supply, for example) to power reception device 20. Power transmission device 10 includes a PFC (power factor correction) circuit 210, an inverter 220, a filter circuit 230, a power transmission unit 240, a power supply ECU (electronic control unit) 250, a communication unit 260, a voltage sensor 270, and a current sensor 272.

PFC circuit 210 can rectify and boost the AC power received from AC power supply 100 for supply to inverter 220 and can bring an input current close to a sinusoidal wave, thereby correcting the power factor. Any of publicly known various PFC circuits can be adopted as this PFC circuit 210. Instead of PFC circuit 210, a rectifier without the power factor correcting function may be adopted.

Inverter 220 converts the DC power received from PFC circuit 210 into transmission power (AC) having a predetermined transmission frequency. The transmission power produced by inverter 220 is supplied to power transmission unit 240 through filter circuit 230.

Specifically, inverter 220 is implemented by a single-phase full bridge circuit including a plurality of circuits, each of which includes a switching element implemented by an IGBT (insulated gate bipolar transistor) element, and a diode connected in anti-parallel to the IGBT element, for example.

Filter circuit 230 is provided between inverter 220 and power transmission unit 240, and suppresses a harmonic noise caused by inverter 220. Filter circuit 230 is implemented by an LC filter including one each of a coil and a capacitor. Filter circuit 230 is not limited to such a configuration. Filter circuit 230 may be implemented by an LC filter including a plurality of coils and a plurality of capacitors, or may be implemented by either a coil or a capacitor.

Power transmission unit 240 receives the AC power (transmission power) having the transmission frequency from inverter 220 through filter circuit 230, and wirelessly transmits the power to a power reception unit 310 of power reception device 20 through an electromagnetic field produced around power transmission unit 240. Power transmission unit 240 includes a resonant circuit for wirelessly transmitting power to power reception unit 310. The resonant circuit is configured to include a power transmission coil 242 and a capacitor 244. Capacitor 244 is provided to compensate for the power factor of transmission power, and is connected in series with power transmission coil 242. The resonant circuit of power transmission device 10 corresponds to a "power transmission circuit."

Voltage sensor 270 detects a voltage V1 between power lines connecting filter circuit 230 and power transmission unit 240, and outputs a detected value to power supply ECU 250. Current sensor 272 detects a current I1 flowing in power transmission unit 240, and outputs a detected value to power supply ECU 250. Current sensor 272 may be provided between inverter 220 and power transmission unit 240, for example. The current flowing in power transmission unit 240 and the voltage of power transmission unit 240 can be detected by voltage sensor 270 and current sensor 272.

Power supply ECU 250, including a CPU (central processing unit), a memory device, an input/output buffer, and the like (neither shown), receives signals from various sensors and devices, and controls various devices in power transmission device 10. As an example, power supply ECU 250 exerts switching control of inverter 220 such that inverter 220 produces the transmission power (AC power) when power transfer from power transmission device 10 to power reception device 20 is performed. Various types of controls are not limited to processing by software, but may be processed by dedicated hardware (electronic circuit).

Communication unit 260 is configured to make wireless communications with a communication unit 370 of power reception device 20. Communication unit 260 receives, from communication unit 370, information indicating a power receiving state of power reception device 20 such as a current I2 flowing in power reception unit 310 of power reception device 20, and an instruction to start wireless power transmission operation (power transmission stalling instruction), for example.

On the other hand, power reception device 20 may be mounted on a vehicle or the like that can travel using the electric power wirelessly transmitted from power transmission device 10, for example. Power reception device 20 includes power reception unit 310, a filter circuit 320, a rectification unit 330, a relay circuit 340, and a power storage device 350. Power reception device 20 further includes a charging ECU 360, communication unit 370, and a current sensor 382.

Power reception unit 350 wirelessly receives the electric power (AC power) output from power transmission unit 240 of power transmission device 10. Power reception unit 310 includes a resonant circuit for wirelessly receiving the power from power transmission unit 240, for example. The resonant circuit is implemented by a power reception coil 312 and a capacitor 314. Capacitor 314 is provided to compensate for the power factor of received power, and is connected in series with power reception coil 312.

The resonant circuit is not necessarily limited to such a configuration. For example, the capacitor may be omitted when a desired resonant state is achieved only with the capacitive component of power reception cod 312, for example. Power reception unit 310 outputs the received power to rectification unit 330 through filter circuit 320.

Filter circuit 320 is provided between power reception unit 310 and rectification unit 330, end suppresses a harmonic noise produced at the time of power reception, filter circuit 320 is implemented by an LC filter including one each of a coil and a capacitor. Filter circuit 320 is not limited to such a configuration. Filter circuit 320 may be implemented by an LC filter including a plurality of coils and a plurality of capacitors, or may be implemented by either a coil or a capacitor.

Rectification unit 330 rectifies the AC power received by power reception unit 310 for output to power storage device 350.

Power storage device 350 is a rechargeable DC power supply, and is implemented by a secondary battery, such as a lithium-ion battery or a nickel-metal hydride battery, for example. Power storage device 350 stores electric power output front rectification unit 330. Power storage device 350 is used to supply electric power to a load driving device or the like not shown during travel of the vehicle or the like.

Relay circuit 340 is provided between rectification unit 330 and power storage device 350, and is closed when power storage device 350 is charged by power transmission device 10. Although not particularly shown, a DC/DC converter that adjusts an output voltage of rectification unit 330 may be provided between rectification unit 330 and power storage device 350 (between rectification unit 330 and relay circuit 340, for example).

Charging ECU 360, including a CPU, a memory device, an input/output buffer, and the like (neither shown), receives signals from various sensors and devices, and controls various devices in power reception device 20. Various types of controls are not limited to processing by software, but may be processed by dedicated hardware (electronic circuit).

Communication unit 370 is configured to make wireless communications with communication unit 260 of power transmission device 10. For example, communication unit 370 transmits, to communication unit 260, information indicating a power receiving state of power reception device 20 such as current I2 flowing in power reception unit 310 of power reception device 20, a power transmission starting instruction, and the like. When power transmission device 10 and the vehicle (power reception device 20) are in such relative positions that allow power transmission, for example, charging ECU 360 transmits the power transmission starting instruction to power transmission device 10 (communication unit 260) via communication unit 370.

In this wireless power transfer system 1, the transmission power (AC power) is supplied from inverter 220 to power transmission unit 240 through filter circuit 230. Power transmission unit 240 and power reception unit 310 each include a coil and a capacitor, and are designed to resonate at a transmission frequency. In some embodiments, the Q factor indicating the resonance strength of power transmission unit 240 and power reception unit 310 is more than or equal to 100.

In power transmission device 10, when the transmission power is supplied from inverter 220 to power transmission unit 240, energy (electric power) is transferred from power transmission unit 240 to power reception unit 310 through an electromagnetic field formed between power transmission coil 242 of power transmission unit 240 and power reception coil 312 of power reception unit 310. The energy (electric power) transferred to power reception unit 310 is supplied to power storage device 350 through filter circuit 320 and rectification unit 330.

When an abnormality such as failure to receive the power at power reception device 20 occurs during the power transmission operation (that is, during the operation of inverter 220) in such wireless power transfer system 1 that wirelessly transmits power from power transmission device 10 to power reception device 20, it is desired that the power transmission be stopped immediately from a viewpoint of system protection. The abnormality such as failure to receive the power at power reception device 20 during the power transmission may be caused, for example, by short-circuiting of power transmission coil 242 of power transmission device 10 or power reception coil 312 of power reception device 20.

Figure 2:
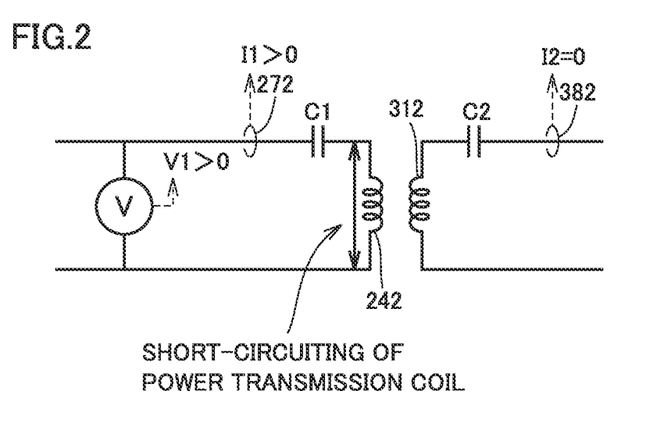
FIG. 2 is a diagram illustrating a failure mode in which a power transmission coil is short-circuited.

For example, FIG. 2 is a diagram illustrating a failure mode in which power transmission coil 242 is short-circuited. As shown in FIG. 2, when power transmission coil 242 is short-circuited, the power cannot be transmitted front power transmission device 10 to power reception device 20 even if the power transmission operation is performed at power transmission device 10. Accordingly, even if both current I1 and voltage V1 are greater than zero, current I2 becomes zero.

Figure 3:
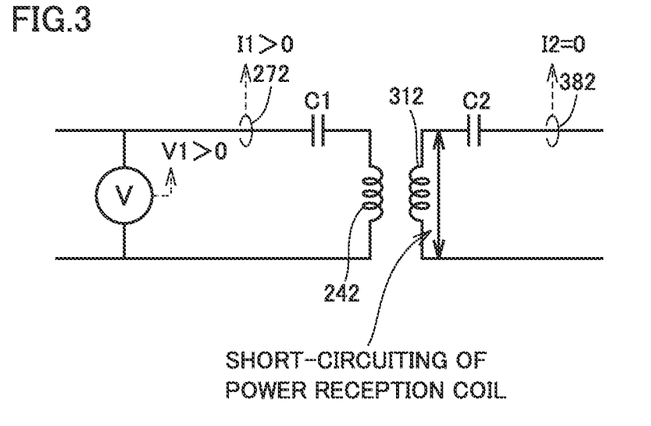
FIG. 3 is a diagram illustrating a failure mode in which a power reception coil is short-circuited.

On the other hand, FIG. 3 is a diagram illustrating a failure mode in which power reception cod 312 is short-circuited. As shown in FIG. 3, when power reception coil 312 is short-circuited, even if the power transmission operation can be performed at power transmission device 10 to transmit power from power transmission device 10 to power reception device 20, the power cannot be received at power reception device 20. Accordingly, even if both current I1 and voltage V1 are greater than zero, current I2 becomes zero.

In this manner, when the power cannot be received at power reception device 20 during tire power transmission operation of power transmission device 10, whether due to the short-circuiting of power transmission coil 242 or due to tire short-circuiting of power reception coil 312, currents I1, I2 and voltage V1 all show similar variations. Thus, even if these variations are detected, it may be impossible to clearly determine which of power transmission coil 242 and power reception coil 312 has been short-circuited.

However, to complete repairs immediately, it is desired to determine which of power transmission device 10 and power reception device 20 is to be repaired (which of the coils has been short-circuited).

Thus, in the present embodiment, when the power cannot be received at power reception device 20 during the power transmission operation, power supply ECU 230 calculates an impedance Z in the power transmission circuit of power transmission unit 240 from voltage V1 and current I1 in the power transmission circuit (=V1/I1). Furthermore, power supply ECU 250 determines that power transmission coil 242 has been short-circuited when calculated impedance Z is greater than a threshold value R0. Chi the other hand, power supply ECU 250 determines that power reception coil 312 has been short-circuited when impedance Z is smaller than threshold value R0.

As such, when power transmission coil 242 has been short-circuited, the power transmission circuit of power transmission unit 240 has a circuit configuration including capacitor 244 and not including power transmission coil 242, so that impedance Z increases as compared to when power transmission coil 242 has not been short-circuited. Thus, when impedance Z is greater than threshold value R0, it can be determined that power transmission coil 242 has been short-circuited. When this impedance Z is smaller than threshold value R0, it is highly likely that power transmission coil 242 has not been short-circuited, and it can be determined that power reception coil 312 has been short-circuited.

Figure 4:
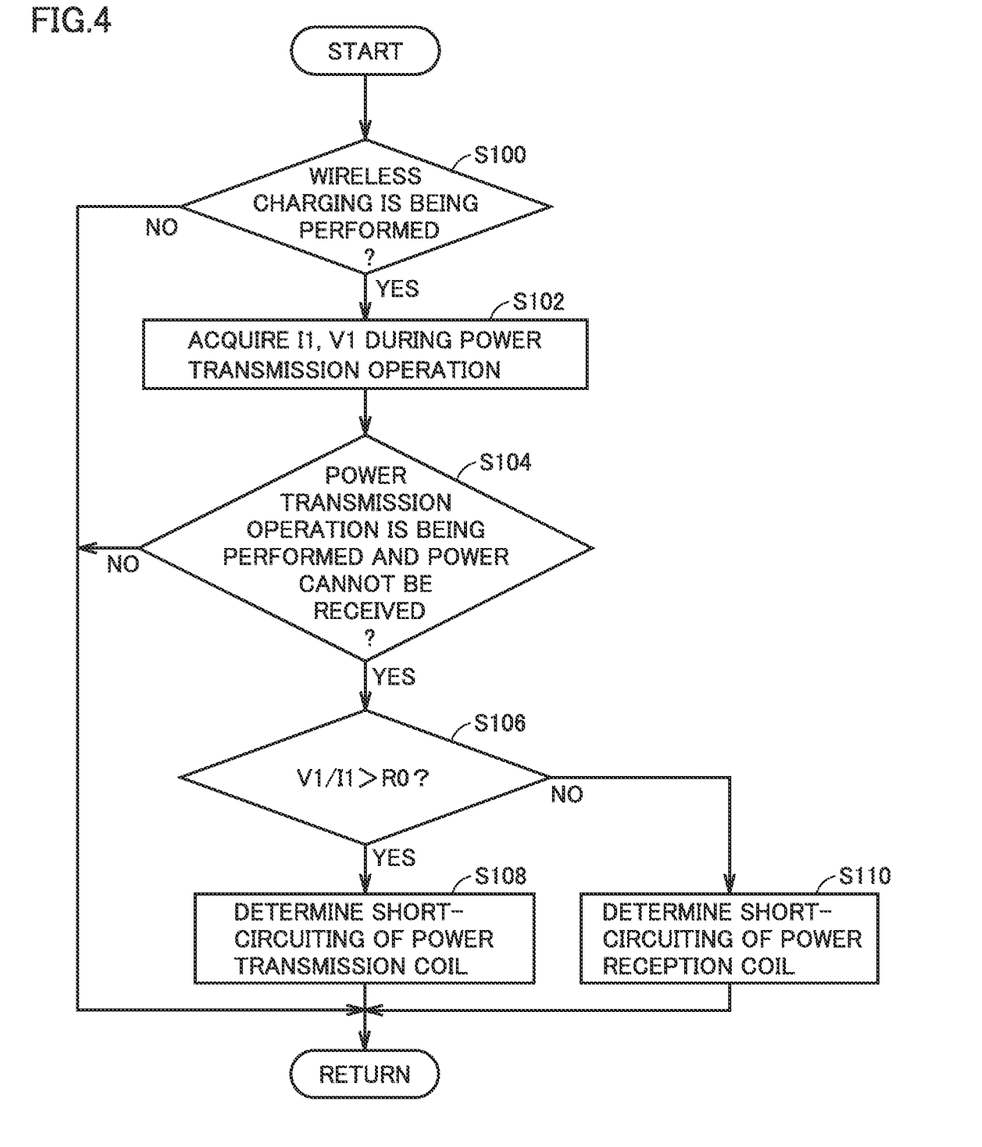
FIG. 4 is a flowchart showing an abnormality determination process of determining a short-circuited coil.

A control process executed by power supply ECU 250 is described below using FIG. 4. FIG. 4 is a flowchart showing the control process executed by power supply ECU 250. The process shown in this flowchart is called and executed from a main routine (not shown) in a predetermined control cycle. Each step included in this flowchart is basically implemented by software processing by power supply ECU 250, but may be partially or entirely implemented by hardware (electric circuit) fabricated within power supply ECU 250.

In step (hereinafter simply represented by S) 100, power supply ECU 250 determines whether or not wireless charging is being performed. Power supply ECU 250 determines that wireless charging is being performed when a flag indicating that wireless charging is being performed is on, for example. Power supply ECU 250 may turn on the flag indicating that wireless charging is being performed when communication unit 260 receives the power transmission starting instruction from power reception device 20, for example. When it is determined that wireless charging is being performed (YES in S100), the process proceeds to S102.

In S102, power supply ECU 250 acquires voltage V1 and current I1 during the power transmission operation Power supply ECU 250 acquires voltage V1 and current I1 from detection results of voltage sensor 270 and current sensor 272.

In S104, power supply ECU 250 determines whether or not the power transmission operation is being performed and the power cannot be received. Power supply ECU 250 determines, when both voltage V1 and current I1 are greater than zero, for example, that the power transmission operation is being performed at power transmission device 10. Power supply ECU 250 also determines, when current I2 received from power reception device 20 via communication unit 260 is zero, that the power cannot be received at power reception device 20. When it is determined that the power transmission operation is being performed and the power cannot be received (YES in S104), the process proceeds to S106.

In S106, power supply ECU 250 determines whether or not a value V1/I1 obtained by dividing voltage V1 by current I1 (=impedance Z) is greater than threshold value R0.

Threshold value R0 is a value for determining whether an abnormality, which is the failure to receive the power although the power transmission operation is being performed, results from the short-circuiting of power transmission coil 242 or the short-circuiting of power reception coil 312. Threshold value R0 is set by previously determining an impedance Z during normal operation when power transmission coil 242 has not been short-circuited by experiment or the like, and adding a predetermined value to that calculated impedance Z, for example.

Figure 5:
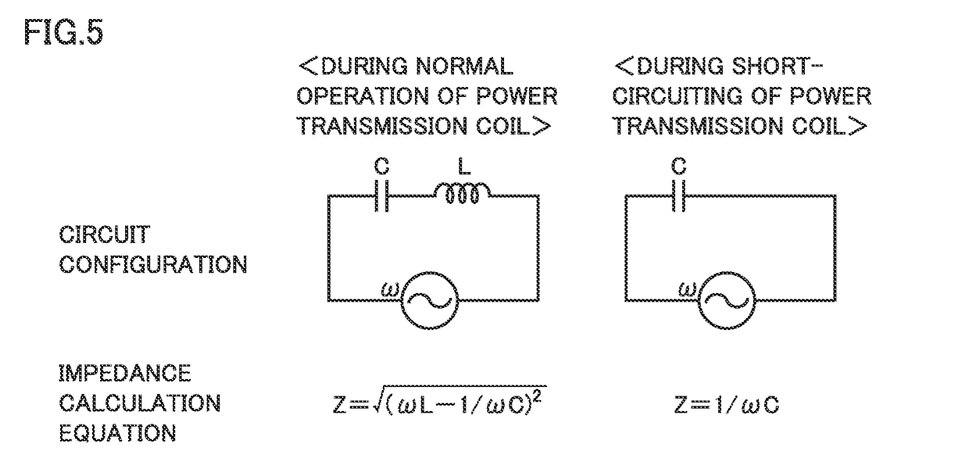
FIG. 5 is a diagram showing configurations of a power transmission circuit and equations for calculating impedance during normal operation and during short-circuiting of the power transmission coil.

FIG. 5 is a diagram showing configurations of the power transmission circuit and equations for calculating impedance Z during normal operation and during an abnormality of power transmission coil 242.

During normal operation of power transmission coil 242, the power transmission circuit of power transmission device 10 has a circuit configuration including power transmission coil 242 and capacitor 244. As such, a first impedance Z1 can be calculated by an impedance calculation equation corresponding to the LC circuit as shown in FIG. 5.

When power transmission coil 242 is short-circuited, on the other hand, the power transmission circuit of power transmission device 10 becomes equivalent to a circuit configuration including only capacitor 244. As such, a second impedance Z2 can be calculated by an impedance calculation equation corresponding to the circuit configuration including only capacitor 244.

That is, when normally operating power transmission coil 242 is short-circuited, impedance Z varies from first impedance Z1 to second impedance Z2. As such, it is desired to set threshold value R0 to a value which is between first impedance Z1 and second impedance Z2, and which is shifted by a predetermined margin from both first impedance Z1 and second impedance Z2 in consideration of variations in component constants and the like.

Figure 6:
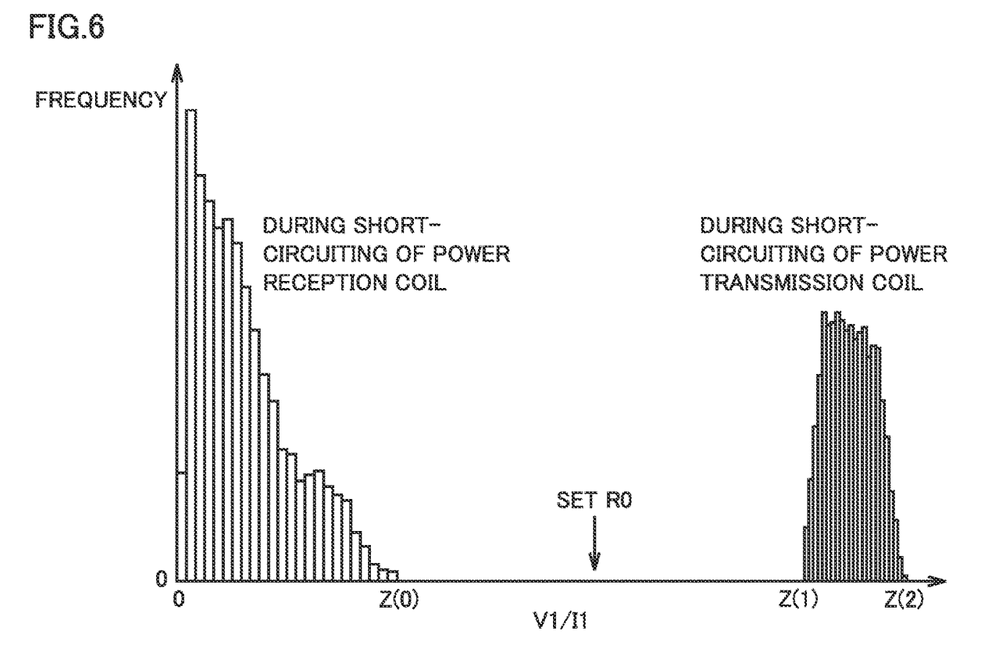
FIG. 6 is a diagram illustrating the setting of R0.

FIG. 6 is a diagram illustrating a method of setting threshold value R0. FIG. 6 shows ranges within which impedance Z may fall and the frequency of each value of impedance Z in consideration of a plurality of combinations of various varying elements, when power transmission coil 242 is short-circuited, and when power reception coil 312 is short-circuited (when power transmission coil 242 is normally operating).

The various varying elements include, for example, variation in component constants of tire coil and the capacitor, variation in driving frequency of inverter 220, a deviation in relative positions of power transmission coil 242 and power reception coil 312, and variation in a range of voltage (charging voltage) in power reception device 20.

As shown in FIG. 6, in consideration of Use various varying elements, the range within which impedance Z may fall when power reception coil 312 is short-circuited is a first range between 0 and Z(0), and the range within which impedance Z may fall when power transmission coil 242 is short circuited is a second range between Z(1) and Z(2). That is, by setting threshold value R0 within between Z(0) and Z(1) between the first range and the second range, it is possible to dearly determine whether power transmission coil 242 has been short-circuited or power reception coil 312 has been short-circuited. As such, threshold value R0 can be set to the midpoint between Z(0) and Z(1), for example, so that it can be set to a value shifted by a predetermined margin from both the first range and the second range.

Returning to FIG. 4, when it is determined that value V1/I1 obtained by dividing voltage V1 by current I1 is greater than threshold value R0 (YES in S106), the process proceeds to S108. In S108, power supply ECU 250 determines that power transmission coil 242 has been short-circuited.

When it is determined that value V1/I1 obtained by dividing voltage V1 by current I1 is smaller than or equal to threshold value R0 (NO in S106), the process proceeds to S110. In S110, power supply ECU 250 determines that power reception coil 312 has been short-circuited.

When it is determined that wireless charging is not being performed (NO in S100), or when the power transmission operation is not being performed, or when the power can be received during the power transmission operation (NO in S104), this process ends.

Figure 7:
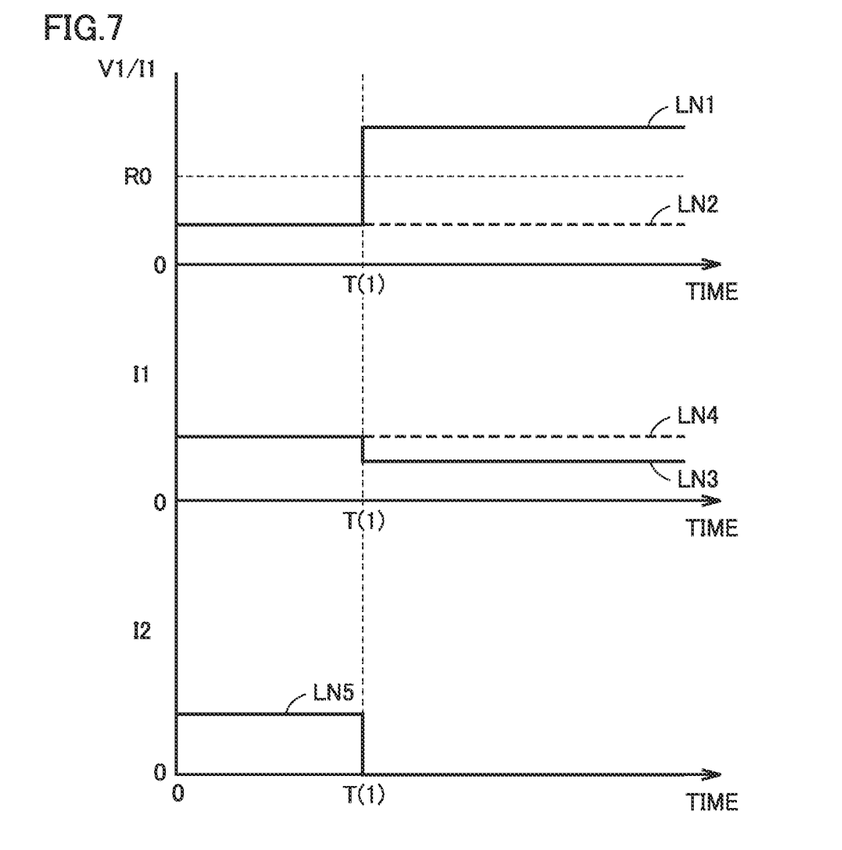
FIG. 7 is a diagram illustrating an operation of a power supply ECU.

An operation of power supply ECU 250 based on the structure and flowchart as described above is described using FIG. 7. FIG. 7 is a diagram illustrating the operation of power supply ECU 250. The horizontal axis of FIG. 7 represents time. The vertical axis of FIG. 7 represents V1/I1, current I1 and current I2. Lines LN1 and LN2 represent variation in V1/I1. Line LN3 and LN4 represent variation in current I1. A line LN5 represents variation in current I2.

It is assumed, for example, that wireless power transmission operation is being performed. It is also assumed that, at this point in time, neither power transmission coil 242 nor power reception coil 312 has been short-circuited. That is, electric power wirelessly transmitted from power transmission device 10 is being received at power reception device 20, and power storage device 350 is being charged with the received power.

In this case, it is determined that wireless charging is being performed (YES in S100), and it is determined that the power transmission operation is being performed and the power can be received (NO in S104).

<When Power Transmission Coil 242 is Short-Circuited>

When power transmission coil 242 is short-circuited at time T(0), current I2 becomes zero as indicated by line LN5 (solid line) in FIG. 7, and therefore it is determined that the power transmission operation is being performed and the power cannot be received (YES in S104). In this case, current I1 and voltage V1 are acquired (S106), and a value of V1/I1 is calculated. The short-circuiting of power transmission coil 242 causes an increase in the value of V1/I1 as indicated by line LN1 (solid line) in FIG. 7, so that current I1 decreases as indicated by line LN3 (solid line) in FIG. 7. When it is determined that calculated V1/I1 is greater than threshold value R0 (YES in S106), it is determined that power transmission coil 242 has been short-circuited.

<When Power Reception Coil 312 is Short-Circuited>

When power reception coil 312 is short-circuited at time T(0), current I2 becomes zero as indicated by line LN5 (solid line) in FIG. 7, and therefore it is determined that the power transmission operation is being performed and the power cannot be received (YES in S104). In this case, current I1 and voltage V1 are acquired (S106), and a value of V1/I1 is calculated. The short-circuiting of power reception coil 312 does not cause variation in the value of V1/I1 as indicated by line LN2 (broken line) in FIG. 7, so that current I1 does not vary as indicated by line LN4 (broken line) in FIG. 7. When it is determined that calculated V1/I1 is smaller than or equal to threshold value R0 (NO in S106), it is determined that power reception coil 112 has been short-circuited.

In this manner, in accordance with wireless power transfer system 1 and power transmission device 10 according to the present embodiment, when power transmission coil 242 has been short-circuited, the power transmission circuit has a circuit configuration including capacitor 244 and not including power transmission coil 242, so that impedance Z increases as compared to when power transmission coil 242 has not been short-circuited. Thus, when impedance Z is greater than threshold value R0, it can be determined that power transmission coil 242 has been short-circuited. When this impedance Z is smaller than or equal to threshold value R0, it is highly likely that power transmission coil 242 has not been short-circuited, and it can be determined that power reception coil 312 has been short-circuited. Accordingly, there can be provided a wireless power transfer system and a power transmission device to determine, when an abnormality occurs during wireless power transmission, in which of the power transmission device and a power reception device the abnormality has occurred.

Furthermore, power supply ECU 250 can determine that the power cannot be received during the power transmission operation by detecting, by means of currents I1 and I2, that a current is flowing in the power transmission circuit of power transmission device 10 and a current is not flowing in power reception device 20.

Furthermore, threshold value R0 is set by adding the predetermined value to impedance Z of the power transmission circuit when power transmission coil 242 has not been short-circuited. As such, threshold value R0 for determining whether power transmission coil 242 has been short-circuited or power reception coil 312 has been short-circuited can be set appropriately.

A modification is described below.

Although the embodiment above has described calculating impedance Z of the power transmission circuit of power transmission device 10 by power supply ECU 250 of power transmission device 10 when the power cannot be received during the power transmission operation, and performing the abnormality determination process of determining whether power transmission coil 242 has been short-circuited or power reception coil 312 has been short-circuited based on calculated impedance Z, the abnormality determination process may be executed by charging ECU 360 of power reception device 20, for example. That is, impedance Z of the power transmission circuit of power transmission device 10 may be calculated by charging ECU 360, to determine whether power transmission coil 242 has been short-circuited or power reception coil 312 has been short-circuited based on calculated impedance Z.

In this case, charging ECU 360 executes a process similar to the process shown in the flowchart of FIG. 4. The process executed by charging ECU 360 is different from the process executed by power supply ECU 250 as follows.

For example, charging ECU 360 transmits the power transmission starting instruction to power transmission device 10, and turns on the wireless charging flag. Charging ECU 360 also acquires current I1 and voltage V1 by receiving current I1 and voltage V1 from communication unit 260 of power supply ECU 250 via communication unit 370. Charging ECU 360 determines that the power cannot be received when current I2 detected by current sensor 382 becomes zero during the power transmission operation.

In this case, too, charging ECU 360 can determine whether power transmission coil 242 has been short-circuited or power reception coil 312 has been short-circuited based on whether or not impedance Z is greater than threshold value R0. Accordingly, there can be provided a power reception device to determine, when an abnormality occurs during wireless power transmission, in which of a power transmission device and the power reception device the abnormality has occurred.

Furthermore, although the embodiment above has described calculating impedance Z of the power transmission circuit of power transmission device 10 by power supply ECU 250 of power transmission device 10 when the power cannot be received during the power transmission operation, and executing the abnormality determination process of determining whether power transmission coil 242 has been short-circuited or power reception coil 312 has been short-circuited based on calculated impedance Z, the abnormality determination process may be executed by an abnormality determination device separate from power transmission device 10 and power reception device 20, fox example.

Although the present disclosure has been described and illustrated in detail, it is clearly understood that the same is by way of illustration and example only and is not to be taken by way of limitation, the scope of the present disclosure being interpreted by the terms of the appended claims.

What is claimed is:

1. A power transmission device configured to wirelessly transmit electric power to a power reception device including a power reception coil, the power transmission device comprising:
   a power transmission circuit having a power transmission coil and a capacitor connected in series; and
   an abnormality determination device configured to determine, when the power cannot be received at the power reception device during power transmission operation of the power transmission device, in which of the power transmission device and the power reception device an abnormality has occurred, wherein
   when the power cannot be received at the power reception device during the power transmission operation, the abnormality determination device is configured to calculate an impedance in the power transmission circuit from a voltage and a current in the power transmission circuit, determine that the power transmission coil has been short-circuited when the calculated impedance is greater than a threshold value, and determine that the power reception coil has been short-circuited when the calculated impedance is smaller than the threshold value.

2. The power transmission device according to claim 1, wherein
   the abnormality determination device is configured to determine, when a current is flowing in the power transmission circuit and a current is not flowing in the power reception device, that the power cannot be received at the power reception device during the power transmission operation.

3. The power transmission device according to claim 1, wherein
   the threshold value is set by adding, to an impedance of the power transmission circuit when the power transmission coil has not been short-circuited, a predetermined value.

4. A power reception device configured to wirelessly receive electric power from a power transmission device including a power transmission circuit having a power transmission coil and a capacitor connected in series, the power reception device comprising:
   a power reception coil; and
   an abnormality determination device configured to determine, when the power cannot be received at the power reception device during power transmission operation of the power transmission device, in which of the power transmission device and the power reception device an abnormality has occurred, wherein
   when the power cannot be received at the power reception device during the power transmission operation, the abnormality determination device is configured to calculate an impedance in the power transmission circuit from a voltage and a current in the power transmission circuit, determine that the power transmission coil has been short-circuited when the calculated impedance is greater than a threshold value, and determine that the power reception coil has been short-circuited when the calculated impedance is smaller than the threshold value.

5. A wireless power transfer system comprising:
   a power transmission device including a power transmission circuit having a power transmission coil and a capacitor connected in series, and configured to wirelessly transmit electric power;
   a power reception device including a power reception coil and configured to wirelessly receive electric power from the power transmission device; and
   an abnormality determination device configured to determine, when the power cannot be received at the power reception device during power transmission operation of the power transmission device, in which of the power transmission device and the power reception device an abnormality has occurred, wherein
   when the power cannot be received at the power reception device during the power transmission operation, the abnormality determination device is configured to calculate an impedance in the power transmission circuit from a voltage and a current in the power transmission circuit, determine that the power transmission coil has been short-circuited when the calculated impedance is greater than a threshold value, and determine that the power reception coil has been short-circuited when the calculated impedance is smaller than the threshold value.

* * * * *

UNITED STATES PATENT AND TRADEMARK OFFICE
CERTIFICATE OF CORRECTION

PATENT NO. : 10,897,157 B2
APPLICATION NO. : 16/103432
DATED : January 19, 2021
INVENTOR(S) : Yoshinobu Sugiyama It is certified that error appears in the above-identified patent and that said Letters Patent is hereby corrected as shown below:

In the Specification

In Column 5, Line(s) 10, delete "350" and insert --310--, therefor.

In Column 5, Line(s) 22, delete "cod" and insert --coil--, therefor.

In Column 5, Line(s) 26, delete "end" and insert --and--, therefor.

In Column 5, Line(s) 27, delete "reception, filter" and insert --reception. Filter--, therefor.

In Column 5, Line(s) 41, delete "front" and insert --from--, therefor.

In Column 6, Line(s) 40, delete "front" and insert --from--, therefor.

In Column 6, Line(s) 47, delete "cod" and insert --coil--, therefor.

In Column 6, Line(s) 56, delete "tire" and insert --the--, therefor.

In Column 6, Line(s) 59, delete "tire" and insert --the--, therefor.

In Column 7, Line(s) 3, delete "230" and insert --250--, therefor.

In Column 7, Line(s) 9, delete "Chi" and insert --On--, therefor.

In Column 7, Line(s) 48, after "operation", insert --.--.

In Column 8, Line(s) 46, delete "tire" and insert --the--, therefor.

In Column 8, Line(s) 51, delete "Use" and insert --the--, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 10,897,157 B2

In Column 8, Line(s) 59, delete "dearly" and insert --clearly--, therefor.

In Column 9, Line(s) 61, delete "112" and insert --312--, therefor.

In Column 11, Line(s) 12, delete "fox" and insert --for--, therefor.